G. CONSTANTINESCU.
VAPORIZING APPARATUS.
APPLICATION FILED JUNE 25, 1913.
Reissued Oct. 28, 1913.
13,635.
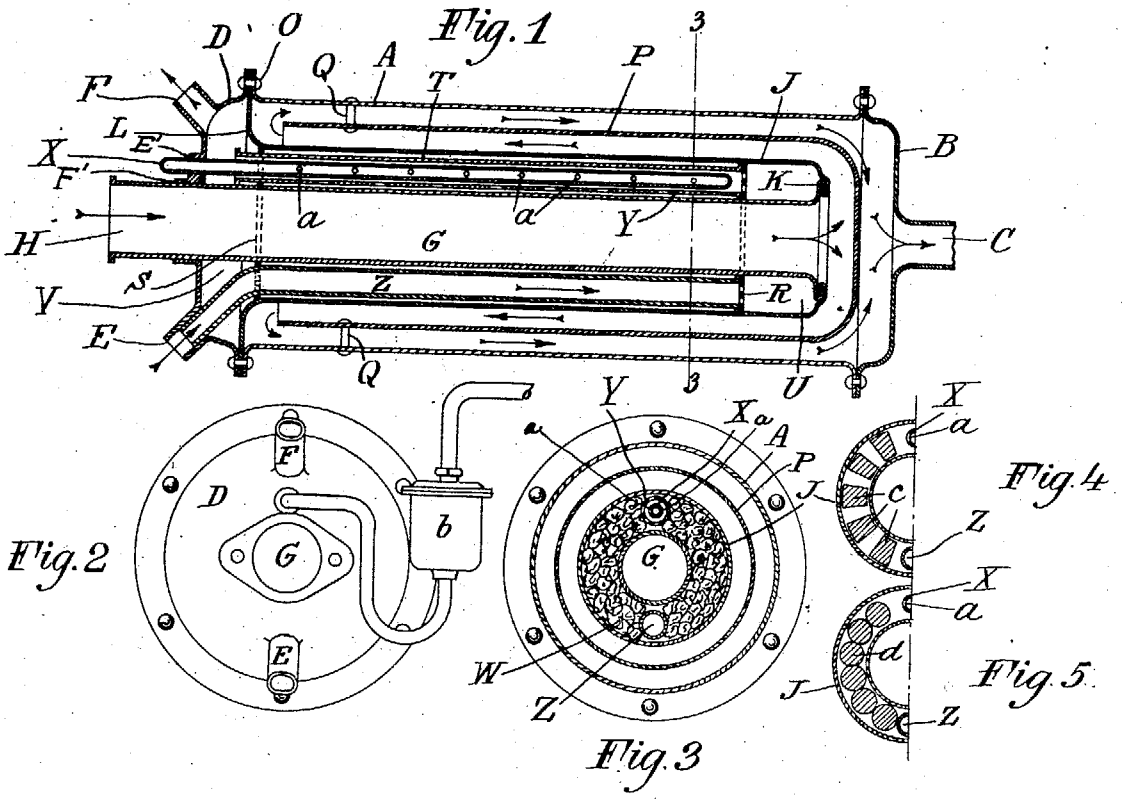
Witnesses:
M. M. Riemann
A. E. Parkman
Gogu Constantinescu Inventor
By his Attorney
Herbert G. Ogden

UNITED STATES PATENT OFFICE.

GOGU CONSTANTINESCU, OF BLOOMSBURY, LONDON, ENGLAND.

VAPORIZING APPARATUS.

13,635. Specification of Reissued Letters Patent. Reissued Oct. 28, 1913.

Original No. 1,021,039, dated March 26, 1912, Serial No. 645,250. Application for reissue filed June 25, 1913. Serial No. 775,804.

*To all whom it may concern:*

Be it known that I, GOGU CONSTANTINESCU, a subject of the King of Roumania, residing at Bloomsbury, London, England, have invented certain new and useful Improvements in Vaporizing Apparatus, of which the following is a specification, accompanied by drawings.

This invention relates to vaporizing apparatus, more particularly to apparatus for vaporizing hydro-carbons and other suitable fuels, by means of heat. The gas so generated may be used for gas engines and other uses, and the vaporizing apparatus is especially designed to operate in conjunction with the gas engine, so that the waste gases may be utilized for heating the vaporizer. Obviously, the apparatus may, however, be heated in any desired manner.

I do not herein claim any of the features of vaporizing apparatus disclosed and claimed in my copending applications Serial No. 634,808, filed June 22, 1911, and Serial No. 642,244, filed August 4, 1911, as the features claimed in said copending applications are not herein disclosed or claimed.

The objects of the present invention are to improve upon the construction of vaporizing apparatus of the class to which the invention relates, increase the efficiency, make the apparatus more economical in consumption of fuel, more thoroughly vaporize the fuel, and secure means for maintaining a substantially constant heat in the apparatus for vaporizing purposes.

Further objects of the invention will hereinafter appear and the invention is embodied in one of its preferred forms in the accompanying drawings, in which—

Figure 1 is a longitudinal sectional view of vaporizing apparatus; Fig. 2 is an end elevation; Fig. 3 is a transverse sectional view on the line 3—3 of Fig. 1; Fig. 4 is one-half of a transverse sectional view of a modification; and Fig. 5 is a view similar to Fig. 4, of another modification.

Referring to the drawings, A represents an outer shell or casing constructed in any suitable manner and adapted to contain the parts of the vaporizing apparatus. This shell or casing A may be provided with the head B having the exhaust outlet C, and the head D having the opening E for an air pipe, the gas eduction outlet F, the opening E′ for a fuel feed pipe, and the central opening F′ for an exhaust conduit.

The conduit G is provided for heating gases, as for instance, the exhaust gases from a gas engine, and this exhaust gas conduit is preferably centrally arranged, as shown and extending through the opening F′ in the head D. The exhaust gases are adapted to enter the conduit G at the inlet H and pass in the direction of the arrows in a tortuous passage through the apparatus to the exhaust outlet C, thus heating the vaporizing chamber formed within the apparatus.

The vaporizing chamber which is preferably of annular form and concentric with the exhaust gas conduit G, may be formed by the walls of the conduit G and the cylinder J, the ends of which are suitably connected at K forming a closed end for the vaporizing chamber. The flanges L of the cylinder J may be suitably connected to the casing A as by means of the bolts or rivets O. The exhaust conduit G and the vaporizing chamber are thus supported at one end only, the inner ends K being free and unsupported, so as to allow for expansion and contraction of the parts.

In order to provide the tortuous passage for the exhaust gases, a cylindrical baffle P closed at one end is arranged between the vaporizing chamber and the casing A and supported in position at one end as by means of the bolts or fastening devices Q, so that the opposite end of the baffle is unsupported to allow for expansion and contraction.

I prefer to sub-divide the vaporizing chamber as by means of the annular perforated partitions R and S into the main portion T, the auxiliary chamber U and the reservoir chamber V. The main portion T of the vaporizing chamber preferably contains non-absorbent heat conducting material W which may be in the form of lumps or fragments of copper or iron, for example. A liquid fuel feed pipe X as shown passes through the head D into the vaporizing chamber and through this pipe the liquid fuel is fed to the non-absorbent heat conducting material or bodies in the vaporizing chamber. It will be observed that in the construction of my apparatus the exhaust conduit H extends substantially horizontally and the vaporizing chamber is contiguous to said exhaust conduit and also extends substantially horizontally. The mass of non-absorbent heat conducting material W in the vaporizing chamber affords an extended substantially horizontal surface to which the liquid fuel is fed, and this mass of material is in contact with the walls of the exhaust conduit and has interstices adequate to give passage to the fuel to be vaporized.

The fuel feed pipe X is preferably provided with apertures *a* in its sides and spaced apart throughout its length, the walls of the fuel feed pipe being otherwise imperforate, so that the liquid fuel is fed from the sides of the pipe, rather than from the bottom. By this means a more uniform distribution of the fuel is obtained along the length of the annular vaporizing chamber. If desired, a perforated tube or sleeve Y may be inserted in the vaporizing chamber over the fuel feed conduit X so that the tube or conduit X may be inserted and withdrawn without disturbing the heat conducting material W.

Means are provided in the apparatus for admitting a restricted amount of air to the vaporizing chamber, in this instance a small air tube Z being inserted through the partition S preferably in the lower portion of the vaporizing chamber and extending to the perforated partition R. As shown, the end of the air tube preferably abuts against the partition R, so that the inlet of air to the vaporizing chamber is restricted because of the relatively small size of the air tube and further, if desired, by means of the perforations in the partition R falling opposite the end of the tube Z. By this means the air entering the auxiliary chamber U is drawn through the remaining perforations in the partition R into the vaporizing chamber and passes through the interstices between the bodies W.

Liquid fuel may be fed to the fuel feed pipe X from the reservoir or fuel feed chamber *b* shown in Fig. 2 and connected to the feed pipe X, preferably below the level of the perforated horizontal portion of said pipe and the inlet and outlet ports of the vaporizing chamber are preferably proportioned relatively to said chamber, so that suction therethrough from the motor cylinder is adapted to produce in the chamber a partial vacuum sufficient to produce feed from the pipe X. The liquid fuel is fed in minute separate streams from the orifices spaced apart along the fuel feed pipe X, and vaporization of the fuel takes place in the vaporizing chamber, due to the heated condition of the chamber and the heat imparted to the mass of non-absorbent heat conducting bodies or material W in said chamber.

In Fig. 4 a modification of a portion of the apparatus is shown, in which metal rods *c* are shown instead of the fragments or lumps and these rods may be rectangular in cross section and spaced apart, as indicated in the drawing and extending through the chamber substantially parallel to its axis. These rods preferably fit loosely into the vaporizing chamber, so as to leave small clearance for the passage of fuel between their inner and outer faces and the walls of the chamber. In this modification also it will be observed that the perforated sleeve Y is omitted around the fuel feed pipe X.

In the modification shown in Fig. 5, cylindrical rods *d* are shown, preferably arranged in contact with each other and these rods may be made tubular, if desired, in order to save weight. The function of the rods *c* and *d* like that of the bodies W is, on the one hand to afford a large evaporating surface, and on the other hand to act as a heat accumulator which will assist in furnishing heat while the engine is running below normal speed, and will enable the vaporizer to start work again without auxiliary heating after a lengthy stoppage of the engine.

The arrangement of air pipe Z in the vaporizing chamber insures effective heating of the air, prior to its entrance to the vaporizing chamber and if desired, a plurality of air pipes may be used traversing the vaporizing chamber if the size of the apparatus renders sub-division of the air supply desirable. As pointed out, one great advantage of disposing the fuel inlet and air inlet at the same end of the apparatus, as the exhaust inlet, resides in the fact that the apparatus can be made so as to allow a free expansion thereof in all its parts in an axial direction, thus eliminating a tendency to warp and sheer.

In the operation of the apparatus, the hot exhaust gases heat the vaporizing chamber on all sides, and the motor suction tends to produce a partial vacuum in the vaporizing chamber. The restricted amount of air admitted to the vaporizing chamber is to prevent the formation of a vacuum and to prevent a too rapid supply of fuel as the gas is drawn off. The liquid discharged into the mass of heat conducting material is vaporized by contact with the hot metallic mass, which is capable of storing a considerable amount of heat and has a large internal surface for the transfer of the said heat to the liquid.

The various dimensions of the parts are, of course, proportioned according to the nature of the fuel, which is normally used, so as to secure the proper rate of vaporization for the motor served. The vaporization adapts itself to the power developed by the motor. The greater the suction the greater the tendency to draw a vacuum in the vaporization chamber with corresponding increase in the rate of flow of liquid through the tube X. The amount of heat generated also increases proportionately, so that the vaporization increases to meet the increased demand of the motor. Any fuel which accumulates in the auxiliary chamber U may drain off through the air pipe Z, which is an advantageous construction.

I claim and desire to obtain by Letters Patent of the United States, as follows:

1. A vaporizer comprising a central horizontal conduit for exhaust gases, an annular vaporizing chamber concentric with said conduit and having therein non-absorbent heat conducting bodies, a substantially horizontal liquid fuel feed pipe extending into the upper portion of said annular vaporizing chamber and embedded in said heat conducting bodies, said liquid fuel feed pipe having apertures spaced apart along its length, through which apertures the liquid is fed in minute separate streams and passes into the interstices in said heat conducting bodies, and means for withdrawing the gas from said vaporizing chamber.

2. A vaporizer comprising a central horizontal conduit for exhaust gases, an annular vaporizing chamber concentric with said conduit and having therein non-absorbent heat conducting bodies, a substantially horizontal liquid fuel feed pipe extending into the upper portion of said annular vaporizing chamber and embedded in said heat conducting bodies, said liquid fuel feed pipe having apertures spaced apart along its length, through which apertures the liquid is fed in minute separate streams and passes into the interstices in said heat conducting bodies, means for withdrawing the gas from said vaporizing chamber, and means for introducing a restricted amount of air into said vaporizing chamber.

3. A vaporizer comprising a central horizontal conduit for exhaust gases, an annular vaporizing chamber concentric with said conduit, and having therein non-absorbent heat conducting bodies, an outer casing surrounding said vaporizing chamber, means for returning the exhaust gases in the reverse direction between said outer casing and the walls of the vaporizing chamber, thus heating said chamber on all sides, a substantially horizontal liquid fuel feed pipe extending into the upper portion of said annular vaporizing chamber and embedded in the heat conducting bodies contained within said chamber, said liquid fuel feed pipe having apertures spaced apart along its length, through which apertures the liquid fuel is fed in minute separate streams and passes into the interstices in said heat conducting bodies, means for withdrawing the gas from said vaporizing chamber, and means for introducing a restricted amount of air into said vaporizing chamber.

4. A vaporizer comprising a conduit for exhaust gases, a vaporizing chamber heated by the exhaust gases and having therein non-absorbent heat conducting material, a substantially horizontal liquid fuel feed pipe embedded in said heat conducting material, said liquid fuel feed pipe having apertures spaced apart along its length, the bottom wall of said pipe being imperforate, the liquid being fed through the apertures in the sides of the pipe in minute separate streams, means for withdrawing the gas from said vaporizing chamber, and means for introducing air into said vaporizing chamber.

5. A vaporizer comprising a conduit for exhaust gases, a vaporizing chamber heated by exhaust gases and having therein non-absorbent heat conducting bodies, a substantially horizontal liquid feed pipe extending into said vaporizing chamber, and having apertures spaced apart along its length, and a perforated sleeve over said liquid fuel feed pipe and embedded in the non-absorbent bodies, whereby the fuel feed pipe may be inserted and withdrawn without disturbing said bodies, means for withdrawing the gas from said vaporizing chamber, and means for introducing air into said vaporizing chamber.

6. A vaporizer comprising a central conduit for exhaust gases, an annular vaporizing chamber concentric with said conduit and having an annular perforated partition across the end farthest from the point at which gas is withdrawn, thereby dividing the vaporizing chamber into a main portion and an auxiliary portion, the main portion having therein non-absorbent heat conducting bodies, a substantially horizontal liquid fuel feed pipe extending into said main portion of the vaporizing chamber, said fuel feed pipe being provided with apertures, means for withdrawing the gas from the vaporizing chamber, and means for introducing air into the auxiliary chamber.

7. A vaporizer comprising a central horizontal conduit for exhaust gases, an annular vaporizing chamber concentric with said conduit and having an annular perforated partition at the end farthest from the point at which gas is withdrawn, thereby dividing the chamber into a main portion and an auxiliary portion, a partition at the gas educting end of the chamber forming an auxiliary reservoir chamber, the main portion of the vaporizing chamber having therein non-absorbent heat conducting bodies, a substantially horizontal fuel feed pipe extending into said main portion and having feed apertures, gas eduction means communicating with the auxiliary reservoir chamber and means for introducing air into the auxiliary chamber at the opposite end of the apparatus.

8. A vaporizer comprising a horizontal motor exhaust conduit, a vaporizing chamber contiguous to said conduit and extending along the same, non-absorbent heat conducting bodies disposed in said chamber in contact with said conduit, and having interstices adequate to give passage to the fuel to be vaporized in said chamber, a liquid fuel feed pipe having a horizontal perforated part extending into said chamber, and a fuel tank connected to said feed pipe below the level of said perforated horizontal part, said vaporizing chamber having inlet and outlet ports proportioned relatively to the chamber, so that suction therethrough from a motor cylinder is adapted to produce feed from said fuel feed pipe.

9. A vaporizer comprising a horizontal motor exhaust conduit, a vaporizing chamber contiguous to said conduit and extending along the same, an annular continuance of said exhaust conduit surrounding said vaporizing chamber, non-absorbent heat conducting bodies disposed in said vaporizing chamber in contact with said conduit and having interstices adequate to give passage to the fuel to be vaporized in said chamber, and means for delivering liquid fuel into said interstices in such manner that the delivery of the fuel is distributed uniformly along the length of said conduit.

10. A vaporizer comprising a horizontal motor exhaust conduit, a vaporizing chamber surrounding said conduit and closed at one end by junction of its wall to the wall of said conduit, non-absorbent heat conducting bodies disposed in said vaporizing chamber with interstices between them adequate for the passage of the liquid fuel to be vaporized, a horizontal perforated liquid fuel feed pipe extending into said chamber, so as to afford a series of fuel delivery orifices distributed along the length of the chamber, and an air pipe extending into said chamber and terminating with its delivery orifice near said closed end of the chamber, the inlets of air, fuel and exhaust gas being all at the end of the apparatus opposite to said closed end.

11. A vaporizer comprising a horizontal motor exhaust conduit, a vaporizing chamber surrounding said conduit, and closed at one end by junction of its wall to the wall of said conduit, non-absorbent heat conducting bodies disposed in said chamber with interstices between them adequate for the passage of the liquid fuel to be vaporized, a horizontal perforated liquid fuel feed pipe extending into said chamber, so as to afford a series of fuel delivery orifices distributed along the length of the chamber, an air pipe extending into said chamber and terminating with its delivery orifice near said closed end of the chamber, the inlets of air, fuel and exhaust gas being all at the end of the apparatus opposite said closed end, an external casing and a hollow cylinder closed at one end and open at the other interposed between said casing and said vaporizing chamber, so that the exhaust gases must take a zig-zag path from the exhaust conduit through the said cylinder and then through the casing.

In testimony whereof I have signed this specification in the presence of two subscribing witnesses.

G. CONSTANTINESCU.

Witnesses:
FREDK. KING,
H. E. HARVEY.